G. KENNY.
Whiffletree.
No. 15,461
Patented July 29, 1856.
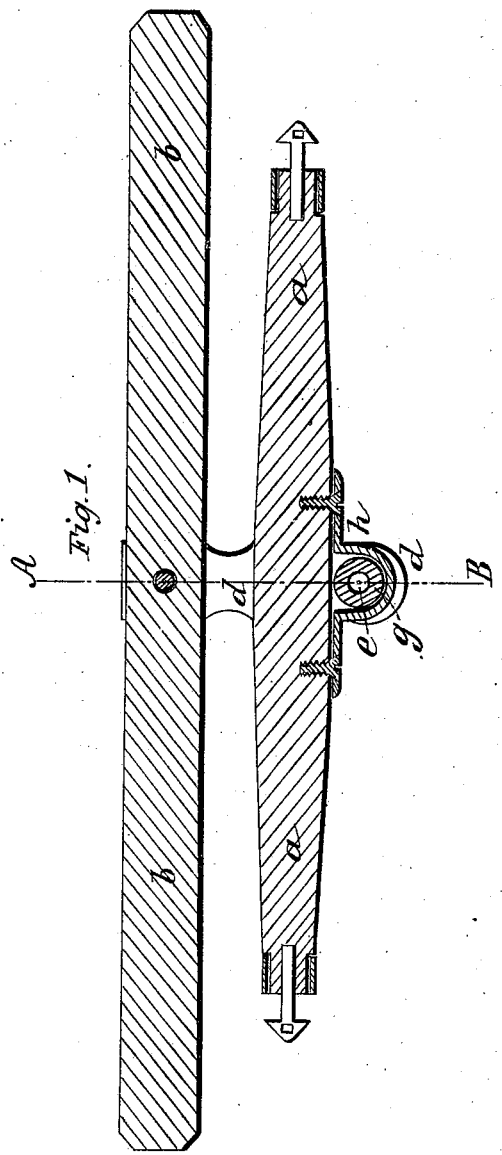
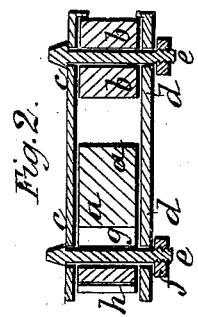
Witnesses.
A. F. Hutchinson
E. C. Batcheller
Inventor.
George Kenny

UNITED STATES PATENT OFFICE.

GEORGE KENNY, OF MILFORD, NEW HAMPSHIRE, ASSIGNOR TO GEORGE KENNY AND GEORGE N. DAVIS, OF BOSTON, MASSACHUSETTS.

WHIFFLETREE.

Specification of Letters Patent No. 15,461, dated July 29, 1856.

*To all whom it may concern:*

Be it known that I, GEORGE KENNY, of Milford, in the county of Hillsboro and State of New Hampshire, have invented certain new and useful Improvements in Whiffletrees, and that the following description, taken in connection with the accompanying drawings hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a central longitudinal vertical section of a whiffle-tree, &c. Fig. 2 is a transverse vertical section of the same, taken in the plane of the line A B, Fig. 1.

The present invention relates to that class of whiffle-trees in which the whiffle-tree is placed in front of the draw-bar, its object being to prevent wear and noise. These objections attendant upon the use of whiffletrees constructed in the usual manner are obviated by my improvements, which consist in applying vulcanized rubber about the "king-bolt" or "draw-bolt" the rubber being inclosed and protected by a suitable box.

*aa* in the drawings represents the whiffletree and *bb* the "draw-bar" the two being connected by horizontal braces *cc—dd*.

*ee* is the bolt upon which the whiffle-tree turns, and extends through both braces *cc—dd*, being secured by a nut *f*, as will be readily understood by inspection of the drawings. A tubular piece of rubber *g* is placed around the bolt *ee* and inclosed by a cylindrical strap *h*. The two braces *cc—dd* cover the top and bottom of the rubber. Thus the rubber is inclosed in a cylindrical box, formed by the braces *cc—dd* and the strap *h*, thereby completely protecting the rubber and excluding all dirt, &c., which if allowed an entrance would soon wear out the rubber. By this arrangement all wear upon the bolt *ee* is prevented and no rattling or noise produced.

It will be seen that my peculiar arrangement of rubber within the cylindrical strap and between the braces *cc, dd* (so as to be compressed by a nut on the bolt *ee*), provides for keeping the rubber from turning on the bolt, so that the torsion of the rubber operates to spring the whiffle-tree back when it is turned, as well as to prevent the wear and noise.

What I claim as my invention and desire to have secured to me by Letters Patent is—

The combination of rubber about the bolt on which the whiffle tree turns within the cylindrical strap and between the braces *cc—dd* so that it may be compressed, and thereby operate as a spring as specified as well as serve to keep out the dirt and prevent the wear and noise.

GEORGE KENNY.

Witnesses:
   G. WADLEIGH,
   MARTIN HALL.